May 29, 1923.
K. EVERTZ
1,456,872
TWO-SPEED, POWER STUMP PULLER
Filed July 21, 1921
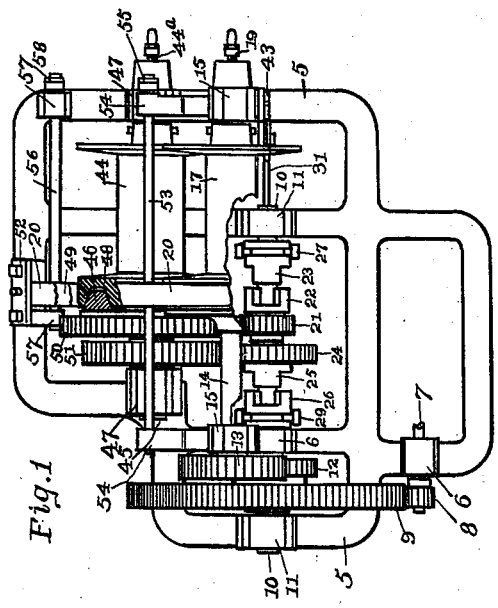
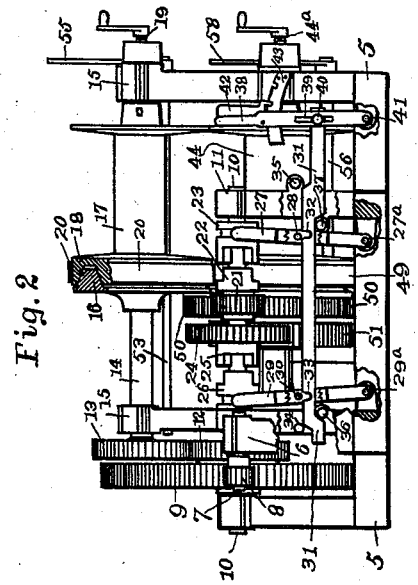
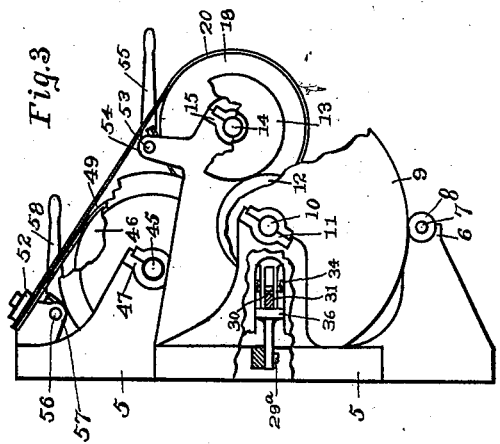
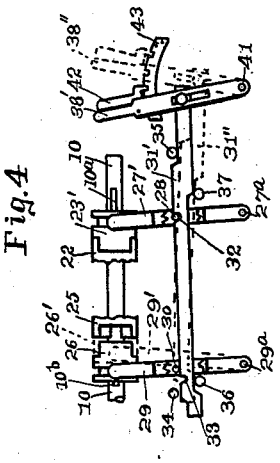
*Knute Evertz*, INVENTOR.
BY *David E. Lain*,
ATTORNEY.

Patented May 29, 1923.

1,456,872

UNITED STATES PATENT OFFICE.

KNUTE EVERTZ, OF BELLINGHAM, WASHINGTON.

TWO-SPEED, POWER STUMP PULLER.

Application filed July 21, 1921. Serial No. 486,322.

*To all whom it may concern:*

Be it known that I, KNUTE EVERTZ, a citizen of the United States, and a resident of Bellingham, in the county of Whatcom and State of Washington, have invented a new and useful Two-Speed, Power Stump Puller, of which the following is a specification.

My invention relates to improvements in stump pullers, and the objects of my improvements are to provide a power stump puller having a haul-back drum and a two-speed pulling and hauling drum, and also to provide a gear shift for the hauling drum. A further object of my improvements is to provide a mechanism so simple in operation and control that the unskilled can operate it safely and effectively with little thought.

I attain these objects with the mechanism illustrated in the accompanying sheet of drawings in which Figure 1 is a plan view of my stump puller, Fig. 2 is a front elevation of Fig. 1, Fig. 3 is an end elevation of Fig. 1, and Fig. 4 is a side elevation of my gear-shifting mechanism shown by itself.

Similar characters refer to similar parts throughout. Certain parts are broken away to show other parts hidden thereby.

More particularly: 5 is the base frame of the machine.

6 is a bearing on frame 5 in which is mounted for revolution the prime mover shaft.

7 is the prime mover shaft mounted in bearing 6 on the end of which is mounted fixed spur gear 8. The prime mover, preferably a gasoline engine, is omitted from the drawing for the sake of the clearness of the illustrations.

Spur gear 8 is engaged with main driving wheel 9.

9 is the main driving gear wheel and is mounted fixed near the outer end of drive shaft 10.

10 is the drive shaft and is mounted for revolution in bearings 11, 11 on base 5.

12 is a driver gear mounted fixed on shaft 10 near gear 9.

13 is a gear meshed with gear 12 and mounted fixed on the outer end of haulback-drum shaft 14.

14 is the haulback-drum shaft and is mounted for revolution in bearings 15, 15 on base 5.

16 is a friction clutch mounted fixed on haulback shaft 14 engageable with haulback drum 17.

17 is the haulback drum mounted for revolution on shaft 14.

18 is a friction flange on one end of haulback drum 17 engaged with friction clutch 16.

19 is a screw, provided with a crank handle, engaged in a boss on frame 5 at one of bearings 15 for causing drum 17 to engage with friction disc 16, and is technically referred to as a hand friction.

20 is a brake band mounted on the friction flange of drum 17. It is fastened to frame 5 by clamp 52 and one end is engaged with brake shaft 53.

21 is a pinion gear mounted for revolution on drive shaft 10, between stops to prevent longitudinal movement on said shaft, and engaged with gear 50.

22 is one part of a positive clutch mounted for revolution on shaft 10 and fixed to gear 21.

23 is the other part of a positive clutch engageable with 22, mounted on shaft 10 for longitudinal movement thereon, engaged with a spline therein for revolution therewith, and having an annular groove engaged with a shifting lever.

24 is a pinion gear mounted for revolution on shaft 10, larger than gear 21, between stops on said shaft to prevent longitudinal movement thereon, and engaged with gear 51.

25 is one part of a positive clutch, fixed to gear 24 and mounted for revolution on shaft 10.

26 is the other part of a positive clutch engageable with 25, mounted on shaft 10 for longitudinal movement thereon, engaged with a spline therein for revolution therewith, and having an annular groove engaged with a shifting lever.

27 is a shifting lever pivoted on frame 5 at 27ª, having a bifurcated upper end engaged with the annular groove in clutch 23.

28 is a pin across a longitudinal slot in the shank of lever 27.

29 is a shifting lever pivoted on frame 5 at 29ᵃ and having a bifurcated upper end engaged with the annular groove on clutch 26.

30 is a pin across a longitudinal slot in the shank of lever 29.

31 is a shifting bar mounted in the slots in levers 27 and 29 on rolls 36 and 37.

32 and 33 are notches in the upper edge of bar 31 adapted to engage with pins 28 and 30 respectively.

34 and 35 are rolls mounted across openings in bearing brackets 11, 11 over bar 31.

36 and 37 are rolls mounted in openings in bearing brackets 11, 11 and mount bar 31.

38 is a hand lever for shifting bar 31, is pivoted to frame 5 at 41, has a longitudinal slot 39 and a latch 42.

43 is a segmental rack fastened to right-hand bearing bracket 15 and has three spaced notches engageable by latch 42.

44 is a hauling and pulling drum mounted for revolution on shaft 45.

44ᵃ is a hand-friction screw engaged in a boss on frame 5 at the end of right-hand bearing 47, adapted to force drum 44 endwise on shaft 45 to engage with friction clutch 46.

45 is a shaft mounted for revolution in bearings 47, 47 on frame 5, and mounts drum 44.

46 is a friction clutch mounted fixed on shaft 45, engageable with friction flange 48.

47, 47 are bearings on frame 5 mounting shaft 45 for revolution.

48 is the friction flange on drum 44.

49 is a brake band mounted on flange 48, one end of which is fastened to frame 5 by clamp 52, and the other end is fastened to brake shaft 56.

50 is a spur gear, larger than gear 51, mounted on shaft 45 and fixed to friction clutch 46.

51 is a spur gear mounted fixed on shaft 45 engaged with pinion 24.

52 is a clamp for fastening brake bands 20 and 49 to frame 5.

53 is a brake shaft mounted for revolution in bearings 54, 54. Brake band 20 is fastened to shaft 53 which has hand lever 55 mounted fixed on its right-hand end.

56 is a brake shaft mounted for revolution in bearings 57, 57; it has brake band 49 fastened thereto, and mounts fixed on its right-hand end hand lever 58.

In the practical operations of pulling stumps a two-speed pulling and hauling drum is desirable; because during the pulling operation the available force must act slowly for greatest effect, while in the hauling operation less torque and greater drum speed are desired.

The means used to change the speed of this drum is important and must preclude the possibility of the simultaneous engagement of both shift gears.

To operate my stump puller: Assume prime-mover shaft 7 to be in continuous revolution in one direction by a prime mover not shown in the illustration, hand frictions 19 and 44ᵃ to be loose, friction clutches 18 and 48 to be out of engagement, and shifting lever 38 to be in its middle position with catch 58 in the middle notch in rack 43. See Fig. 2. Then shaft 10 is revolving, drums 17 and 44 are not in action, and clutches 23 and 26 are disengaged.

To haul the pulling rigging to the stump it is fastened to the haulback line on drum 17 which is riven over a distant lead block, hand friction 19 is employed to engage friction clutch 16 with drum 17, causing said drum to revolve and the rigging to be hauled to the stump. The haulback line is disengaged and returned to the engine by hand, brake lever 55 being employed to prevent the racing of drum 17, said rigging is fastened to the stump, shifting lever 38 is set in its left-hand position with catch 42 in the left-hand notch in rack 43, as shown in full lines in Fig. 4, where clutch 23, 22 is engaged, and hauling and pulling drum 44 is caused to slowly revolve through gears 21 and 50 when hand friction 44ᵃ is employed to engage friction clutch 46, 48.

When the pulling is finished hand friction 44ᵃ is used to disengage friction clutch 46, 48 and shifting lever 38 carried to its dotted position at 38″, Fig. 4, which disengages clutch 22, 23 and engages clutch 25, 26, causing drum 44 to revolve at greater speed through gears 24 and 51 when hand friction 44ᵃ is used to engage friction clutch 16, 20.

When the hauling is completed hand friction 44ᵃ is released, the rigging is disengaged from the stump and fastened to the haulback line, which is then removed from its lead block, and the pulling cable is hauled back to the next stump to be pulled by employing hand friction 19 to engage friction clutch 16, 20. Meanwhile shifting lever 38 has been moved to its middle position.

The operations of shifting bar 31 can be followed from its illustrated three positions at 31, 31′ and 31″, Figs. 2 and 4. When in position 31, Fig. 2, the middle section of its lower edge bears on rolls 36 and 37 allowing the bar to occupy its lowest position with notch 32 disengaged from pin 28 and notch 33 disengaged from pin 30. At this position of the bar hand lever 38 is in its middle position and clutches 23 and 26 are disengaged. Now move lever 38 to its position at 38′ in Fig. 4. Bar 31 has been forced into its position at 31′ by the mounting of the right-hand incline, on the lower edge of the bar, on roller 37 causing the engagement of notch 32 with pin 28 and the shifting of lever 27 to its position at 27′ and clutch 23 to move to its position at 23′ where it engages with clutch 22. The middle section of the lower edge of bar 31 is bearing on roll 36 at its left-hand end thus leaving notch 33 out of engagement with pin 30, and clutch 25, 26 is not engaged. While in its illustrated position at 31' the shifting bar is restrained from upward movements by upper rolls 34 and 35 as shown in Fig. 4.

To move the shifting lever from its position at 31' to its position at 31'' it must pass through its position at 31 where both clutches are disengaged. When in position 31'', shown in dotted outline in Fig. 4, the left-hand lower incline on bar 31 has mounted roll 36 causing notch 33 to engage pin 30 and forcing lever 29 to its position at 29' and clutch 25, 26 in engagement. At this time the right-hand end of the bar is in its lowest position and notch 32 is out of engagement with pin 28, thus leaving clutch 22, 23 disengaged. In position 31'', also, upper rolls 34 and 35 prevent movement upward of bar 31.

It is now apparent that the gear changes controlling the speed of drum 44 are made by one hand lever without possibility of both sets of gears being simultaneously in action.

In practice the above-described speed changing device operates satisfactorily and as intended.

Having thus fully disclosed my invention, what I claim is new and desire to secure by Letters Patent, is,—

In a stump puller in combination, a stump puller frame, a prime mover-shaft mounted for revolution on said frame, a countershaft mounted for revolution on said frame parallel with said prime-mover shaft, positive gear connections between said prime-mover shaft and said countershaft, a puller-drum shaft mounted for revolution on said frame parallel with said countershaft, a large and a small spur gear mounted fixed on said puller-drum shaft, a small and a large spur gear respectively engaged with said large and small fixed spur gears mounted for revolution on said countershaft independently, a positive clutch mounted on said countershaft for reciprocation on a spline engageable with said loose, small, countershaft gear, a positive clutch mounted on said countershaft for reciprocation on a spline engageable with said loose, large, countershaft gear, a pair of levers pivoted on said frame each engaged with one of said positive clutches adapted to permit its revolution and cause it to reciprocate on said countershaft when said lever vibrates on its pivot, a shifting bar having an upper edge of parallel lines connected by two inclined surfaces, also having two notches in its upper edge each engageable with a pin in one of said pivoted levers when said bar is in its upper position and having a lower edge parallel with said upper edge, mounted between two lower and two upper rolls, two lower and two upper rolls mounted on said frame adapted to alternately raise and lower the ends of said bar when it is reciprocated, and a hand lever pivoted on said frame and engaged with said shifting bar adapted to reciprocate the same.

KNUTE EVERTZ.